US012798608B2

(12) United States Patent
Kara

(10) Patent No.: US 12,798,608 B2
(45) Date of Patent: Nov. 17, 2026

(54) ACCESSORY ENGAGEMENT VERIFICATION

(71) Applicant: TORC Robotics, Inc., Blacksburg, VA (US)

(72) Inventor: Mustafa Yasin Kara, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 301 days.

(21) Appl. No.: 18/139,309

(22) Filed: Apr. 25, 2023

(65) Prior Publication Data

US 2024/0359704 A1 Oct. 31, 2024

(51) Int. Cl.
*B60W 60/00* (2020.01)
*B60D 1/36* (2006.01)
*B60D 1/58* (2006.01)
*B62D 53/08* (2006.01)

(52) U.S. Cl.
CPC ............. *B60W 60/001* (2020.02); *B60D 1/36* (2013.01); *B60D 1/58* (2013.01); *B62D 53/0842* (2013.01)

(58) Field of Classification Search
CPC ......... B60W 60/001; B60D 1/36; B60D 1/58; B60D 1/015; B60D 1/62; B62D 53/0842
See application file for complete search history.

(56) References Cited

U.S. PATENT DOCUMENTS

| | | | | |
|---|---|---|---|---|
| 7,806,423 B2 | | 10/2010 | Tobias et al. | |
| 11,643,154 B2 | | 5/2023 | Grossman | |
| 11,803,188 B1 | * | 10/2023 | Gupta | B62D 15/0285 |
| 2006/0186636 A1 | * | 8/2006 | Schutt | B60D 1/36 280/477 |
| 2008/0029995 A1 | | 2/2008 | Alguera | |
| 2009/0184490 A1 | | 7/2009 | Alguera | |
| 2010/0262338 A1 | | 10/2010 | Manuel | |
| 2010/0262341 A1 | | 10/2010 | Manuel | |
| 2013/0297154 A1 | | 11/2013 | Burchett et al. | |

(Continued)

FOREIGN PATENT DOCUMENTS

| | | | | |
|---|---|---|---|---|
| CN | 112672947 A | * | 4/2021 | B62D 53/10 |
| WO | WO-2006048718 A1 | * | 5/2006 | B62D 53/10 |

OTHER PUBLICATIONS

Machine Translation of CN 112672947 A (Year: 2021).*

(Continued)

*Primary Examiner* — Brandon D Lee
(74) *Attorney, Agent, or Firm* — Armstrong Teasdale LLP

(57) ABSTRACT

A system including a first sensor, a second sensor, and one or more processors. The one or more processors are configured to receive a first signal from the first sensor configured to detect a presence of a king pin within a throat of a fifth-wheel hitch of a vehicle, the first sensor coupled to the fifth-wheel hitch of the vehicle; assign a first value to the first signal; receive a second signal from the second sensor configured to detect a jaw of the fifth-wheel hitch, the second sensor cooperatively coupled to the fifth-wheel hitch of the vehicle; assign a second value to the second signal; determine if the first value exceeds a first threshold; determine if the second value exceeds a second threshold; and responsive to at least one of the first value not exceeding the first threshold or the second value not exceeding the second threshold, disable the vehicle.

20 Claims, 11 Drawing Sheets

(56) References Cited

U.S. PATENT DOCUMENTS

| | | | | |
|---|---|---|---|---|
| 2015/0102583 | A1* | 4/2015 | Reimer | B60D 1/015 280/433 |
| 2015/0158355 | A1 | 6/2015 | Alldredge et al. | |
| 2016/0018229 | A1* | 1/2016 | Lee | B60W 60/001 701/409 |
| 2017/0144714 | A1 | 5/2017 | Dupay et al. | |
| 2017/0174019 | A1 | 6/2017 | Lurie | |
| 2017/0174275 | A1* | 6/2017 | Mohamad Jembari | B60K 35/10 |
| 2019/0367107 | A1 | 12/2019 | Grossman | |
| 2020/0273133 | A1* | 8/2020 | Morris | G06F 16/27 |
| 2021/0294337 | A1 | 9/2021 | Van Mill et al. | |
| 2022/0121691 | A1* | 4/2022 | Barathi | G06N 3/048 |
| 2022/0177033 | A1* | 6/2022 | Laine | G01C 21/3844 |
| 2022/0324525 | A1* | 10/2022 | Vikström | B60D 1/62 |
| 2024/0116318 | A1 | 4/2024 | Gaufin et al. | |

OTHER PUBLICATIONS

"Fontaine Fifth Wheel No. Slack™ Rebuild", Fontaine Fifthwheel, published Jan. 9, 2013, Retrieved from Internet: https://www.youtube.com/watch?v=sjRZDvj9Zgk.

"JSK37USK Sensor Technology" flyer, JOST International.

"YF2A14-050UB3XLEAX", Retrieved from Internet: https://www.sick.com/US/en/catalog/accessories/plug-connectors-and-cables/yf2a14-050ub3xleax/p/p559252.

"Jost JSK37USK Series Air-Release Fifth Wheel with Sensor Technology", JOST International, published Jan. 17, 2017, Retrieved from Internet: https://www.oemoffhighway.com/drivetrains/product/20849230/jost-international-jost-jsk37usk-series-airrelease-fifth-wheel-with-sensor-technology.

"Jost International introduces fifth wheel with sensor coupling system", Fleet Equipment Staff, published Jan. 19, 2017, Retrieved from Internet: https://www.fleetequipmentmag.com/jost-international-fifth-wheel-sensor-coupling-systems/.

"IMA30-20BE1ZCOK", Retrieved from Internet: https://www.sick.com/US/en/catalog/products/detection-sensors/inductive-proximity-sensors/ima/ima30-20be1zc0k/p/p233050.

"How to Couple and Uncouple the JOST 5th Wheel", JOSTInternational, published Mar. 12, 2012, Retrieved from Internet: https://www.youtube.com/watch?v=atKelxzvoHA.

"2015 Freightliner Cascadia 125 Fifth Wheels", Retrieved from Internet: https://www.truckcs.com/parts/fsfn3201-8-2015-freightliner-cascadia-125-fifth-wheels.

* cited by examiner

ACCESSORY ENGAGEMENT VERIFICATION

TECHNICAL FIELD

The present disclosure relates generally to autonomous vehicles and, more specifically, to sensing a trailer connection at a fifth-wheel hitch.

BACKGROUND

The use of autonomous vehicles has become increasingly prevalent in recent years, with the potential for numerous benefits, such as improved safety, reduced traffic congestion, decreased commercial costs in shipping, and others.

One challenge faced by autonomous vehicles is autonomously determining when a trailer, or other implement or accessory, is securely hitched to the vehicle without human verification. Trailers are coupled to trucks by a fifth-wheel hitch. Currently, truck operators perform a visual inspection and "tug test" to verify that a trailer is properly coupled to the fifth-wheel hitch. However, this verification method currently requires the on-site presence of an operator to conduct the inspection and "tug test." This leads to increased costs, delayed operating times, and increased personnel requirements. Further, a visual inspection and "tug test" will not be possible as trucks become more autonomous, and operators are not onsite during the hitching of trailers to trucks. Additionally, failure to adequately ensure proper coupling of the trailer can result in damage to the semi-trailer, truck, and/or injury/death to others. Operators are prone to error or forgetting to conduct inspections. Further, the increasing use of aerodynamic technologies make it difficult to physically access the fifth-wheel hitch for visual confirmation of proper coupling.

SUMMARY

What is needed is a reliable system or method for ensuring proper coupling of an accessory to a vehicle without an on-site operator performing a visual inspection. The systems and methods of the present disclosure may solve the problems set forth above and/or other problems in the art. However, the scope of the current disclosure is defined by the attached claims, and not by the ability to solve any specific problem.

Disclosed herein are techniques to autonomously ensure proper coupling of an accessory to a vehicle. Rather than relying on an operator to remember to inspect the hitch and perform an adequate inspection, the present disclosure utilizes various sensors within the fifth-wheel hitch to ensure that the king pin of a trailer is fully engaged in the throat of the fifth-wheel hitch of a truck, the jaws are in the fully closed position to lock the king pin in the throat of the fifth-wheel, and the manual release lever is in the fully locked position. Further, the present disclosure utilizes a system to control the operation of the truck so as to not allow the truck to operate unless the trailer is properly coupled to the truck by the fifth-wheel hitch.

According to one implementation of the present disclosure, a method includes receiving, by a processor, a first signal from a first sensor configured to detect a presence of a king pin within a throat of a fifth-wheel hitch of a vehicle, wherein the first sensor is cooperatively coupled to the fifth-wheel hitch of the vehicle; assigning, by the processor, a first value to the first signal; receiving, by the processor, a second signal from a second sensor configured to detect a jaw of the fifth-wheel hitch, wherein the second sensor is cooperatively coupled to the fifth-wheel hitch of the vehicle; assigning, by the processor, a second value to the second signal; determining, by the processor, if the first value exceeds a first threshold; determining, by the processor, if the second value exceeds a second threshold; and responsive to at least one of the first value not exceeding the first threshold or the second value not exceeding the second threshold, disabling, by the processor, the vehicle.

According to an embodiment, the method further includes upon the first value exceeding the first threshold and the second value exceeding the second threshold, enabling, by the processor, the vehicle.

According to an embodiment, the first value is binary, and the second value is binary.

According to an embodiment, the first sensor is fixedly positioned at an inner surface at a back of the throat of the fifth-wheel hitch.

According to an embodiment, the second sensor is fixedly positioned at an entrance of the throat of the fifth-wheel hitch.

According to an embodiment, the receiving the first signal includes measuring a capacitance between the first sensor and the king pin.

According to an embodiment, the receiving the second signal includes measuring a capacitance between the second sensor and the jaw of the fifth-wheel hitch.

According to an embodiment, the disabling the vehicle comprises one of removing power to a prime mover of the vehicle or engaging a brake of the vehicle.

According to an embodiment, the processor is configured for autonomously maneuvering the vehicle without human intervention.

According to an embodiment, the method further including receiving, by the processor from a third sensor, an indication of a rotation of the king pin in relation to the throat of the fifth-wheel hitch, wherein the third sensor is cooperatively coupled to the fifth-wheel hitch of the vehicle.

A system including: a first sensor; a second sensor; and one or more processors, wherein the one or more processors are configured to: receive a first signal from the first sensor configured to detect a presence of a king pin within a throat of a fifth-wheel hitch of a vehicle, the first sensor cooperatively coupled to the fifth-wheel hitch of the vehicle; assign a first value to the first signal; receive a second signal from the second sensor configured to detect a jaw of the fifth-wheel hitch, the second sensor cooperatively coupled to the fifth-wheel hitch of the vehicle; assign a second value to the second signal; determine if the first value exceeds a first threshold; determine if the second value exceeds a second threshold; and responsive to at least one of the first value not exceeding the first threshold or the second value not exceeding the second threshold, disable the vehicle.

According to an embodiment, the one or more processors are further configured to enable the vehicle upon the first value exceeding the first threshold and the second value exceeding the second threshold.

According to an embodiment, the first value is binary, and the second value is binary.

According to an embodiment, the first sensor is fixedly positioned at an inner surface at a back of the throat of the fifth-wheel hitch.

According to an embodiment, the second sensor is fixedly positioned at an entrance of the throat of the fifth-wheel hitch.

According to an embodiment, the first sensor is configured to measure a capacitance between the first sensor and the king pin.

According to an embodiment, the second sensor is configured to measure a capacitance between the second sensor and the jaw of the fifth-wheel hitch.

According to an embodiment, the one or more processors are configured to disable the vehicle by removing power to a prime mover of the vehicle or engaging a brake of the vehicle.

According to an embodiment, the one or more processors are configured to autonomously maneuver the vehicle without human intervention.

According to an embodiment, the system further including a third sensor configured to measure an angle of rotation of the king pin in relation to the throat of the fifth-wheel hitch, wherein the third sensor is cooperatively coupled to the fifth-wheel hitch of the vehicle.

BRIEF DESCRIPTION OF THE DRAWINGS

The accompanying drawings, which are incorporated in and constitute a part of this specification, illustrate various embodiments and together with the description, serve to explain the principles of the disclosed embodiments.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Figure 1:
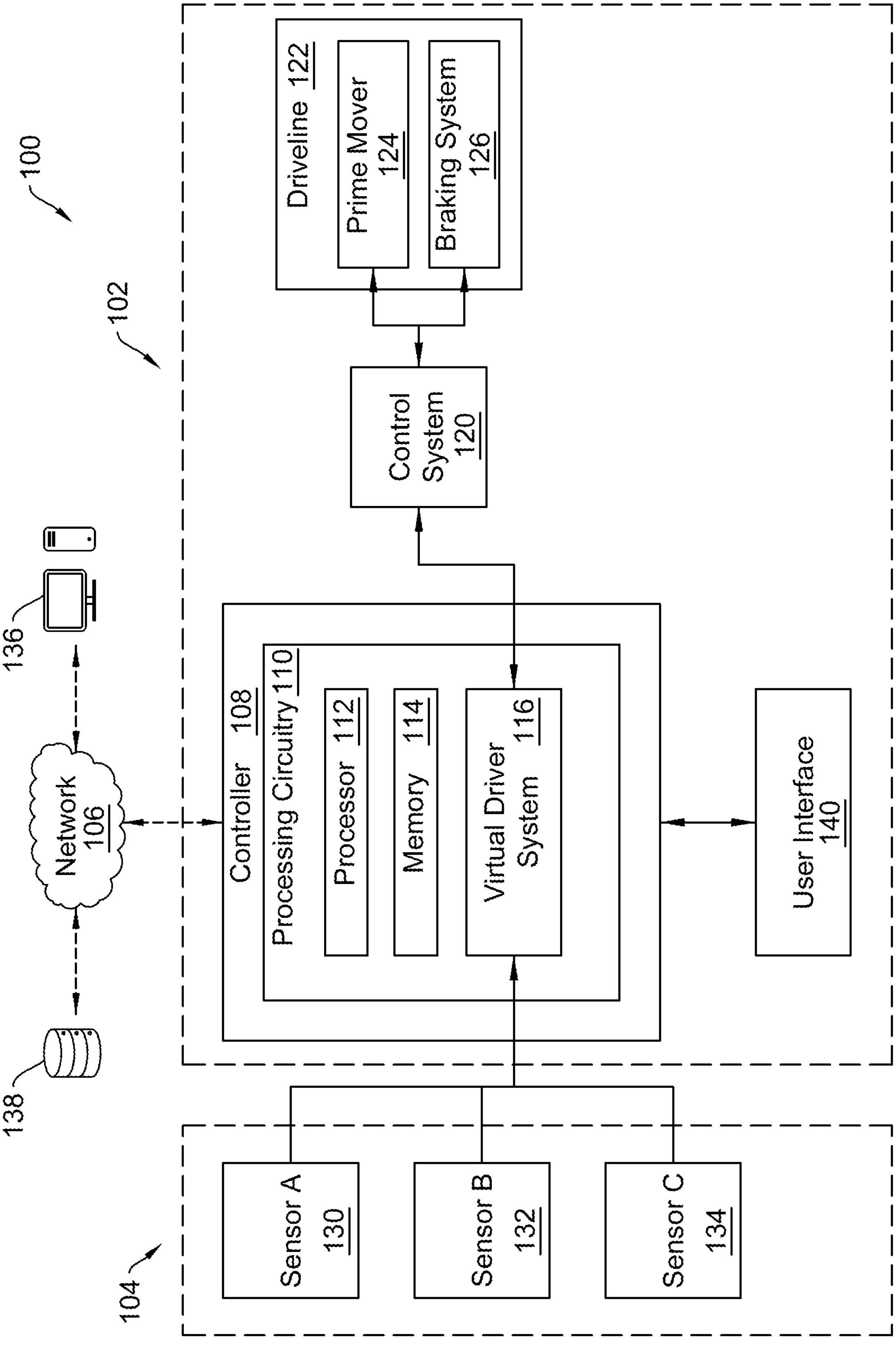
FIG. 1 is a schematic diagram of an engagement verification system, according to an embodiment.

Referring to FIG. 1, the present disclosure relates to an engagement verification system 100 of vehicle 102. The engagement verification system 100 may include the vehicle 102 a coupling receiver 104, and a network 106.

The vehicle 102 may include a controller 108, a control system 120, and a driveline 122. In some embodiments, the vehicle 102 is an autonomous tractor trailer.

As will be described in detail herein, the control system 120 may be used to control the operation and operating parameters of the driveline 122. The driveline 122 may comprise a prime mover 124 and a braking system 126. The coupling receiver 104 may include, among other things, a sensor A 130, a sensor B 132, and sensor C 134. The network 106 may be communicably coupled to the vehicle 102 by way of the controller 108. The controller 108 may include a network interface to facilitate receiving data from, and transmitting data to, network 106. Network 106 may also be communicatively coupled to a remote user device 136 and/or a database 138.

While this disclosure refers to a vehicle 102 (e.g., a tractor trailer) as an autonomous vehicle, it is understood that the vehicle 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Controller 108 may comprise processing circuitry 110, the processing circuitry 110 including a processor 112, a memory 114, and a virtual driver system 116.

The processor 112 of controller 108 may be embodied as one or more of a data processor, a microcontroller, a microprocessor, a digital signal processor, a logic circuit, a programmable logic array, or one or more other devices for controlling the engagement verification system 100 in response to one or more of the system inputs. Engagement verification system 100 may include a single microprocessor or multiple microprocessors that may include means for identifying and reacting to various engagement statuses of coupling receiver 104, as transmitted by sensors 130, 132, 134. Numerous commercially available microprocessors can be configured to perform the functions of the engagement verification system 100. It should be appreciated that engagement verification system 100 could include a general machine controller capable of controlling numerous other machine functions. Alternatively, a special-purpose machine controller could be provided. Further, the engagement verification system 100, or portions thereof, may be located remote from the engagement verification system 100, such as at database 138 or remote user device 136. Various other known circuits may be associated with the engagement verification system 100, including signal-conditioning circuitry, communication circuitry, actuation circuitry, and other appropriate circuitry.

The processor 112 may be a device that performs mathematical operations and logical operations on data. In some embodiments, it is an electronic circuit that receives input data, processes it, and produces output data. The processor 112 may consist of a central processing unit (CPU), which performs the calculations, and other supporting circuits, such as memory 114, virtual driver system 116, user interface 140, and bus controllers.

The CPU may be responsible for executing instructions. It consists of an arithmetic logic unit (ALU) that performs arithmetic and logical operations, and a control unit (CU) that controls the flow of instructions and data within the processor. The ALU performs operations such as addition, subtraction, multiplication, division, and logical operations like AND, OR, and NOT. The CU fetches instructions from memory 114, decodes them, and executes them.

The user interface 140 enable the processor 112 to communicate with other devices, such as keyboards, displays, storage devices, sensors 130, 132, 134, control system 120, and network 106. These interfaces use protocols such as USB, Ethernet, and Wi-Fi to transfer data to and from the processor.

The bus controllers manage the flow of data between the CPU, memory 114, and input/output interfaces (e.g., user interface 140). They ensure that data is transferred efficiently and that multiple devices can share the same bus without interfering with each other.

The processor 112 may also include memory, which stores data and instructions that the processor 112 accesses during its operation. This memory can be volatile, like random-access memory (RAM), which loses data when power is turned off, or non-volatile, like read-only memory (ROM), which retains data even when power is turned off.

The memory 114 of engagement verification system 100 may be integrated into processor 112, or simply be communicably coupled to processor 112. Memory 114 may store data and/or software routines that may assist the engagement verification system 100 in performing its functions, such as the functions of the virtual driver system 116 and the method 200 described herein with respect to FIG. 2. Further, the memory 114 may also store data received from various inputs associated with the engagement verification system 100, such as data from sensor A 130, sensor B 132, and sensor C 134.

The virtual driver system 116 may be embodied as a module, unit, system, or instructions to be executed by the processor 112. The virtual driver system 116 may be stored in memory 114 and, when executed, cause the processor to perform various functions, including the steps and methods of the engagement verification system 100.

According to some embodiments, the virtual driver system 116 receives inputs from sensor A 130, sensor B 132, sensor C 134, remote user device 136, control system 120, and driveline 122. Additionally, the virtual driver system 116 may receive inputs from a local operator or user through user interface 140 housed in vehicle 102. For example, vehicle 102 may include one or more displays and one or more input devices. The one or more displays may be or include a touchscreen, an LCD display, a LED display, a speedometer, gauges, warning lights, etc. The one or more input device may be or include a steering wheel, a joystick, buttons, switches, knobs, levers, an accelerator pedal, a brake pedal, etc. These input devices may be used by the operator of vehicle 102 to interact with the vehicle 102 and control the virtual driver system 116 and/or controller 108.

According to some embodiments, the virtual driver system 116 receives sensor data from sensor A 130, sensor B 132, and sensor C 134. In some embodiments, sensor A 130, sensor B 132, and sensor C 134 are cooperatively coupled to the coupling receiver 104, the coupling receiver 104 being further described in FIGS. 5A-5D. Sensor 130, 132, 134 may be any sensor used to determine the presence of an object. In some embodiments, the sensors 130, 132, 134 may be used to detect the presence of a metal object (e.g., a trailer king pin).

There are various sensors available that can detect the presence of metal in proximity, such as may be used for sensors 130, 132, and 134. The various sensors may work in different ways to sense the metal objects nearby. For example, inductive proximity sensors use electromagnetic fields to detect the presence of metal within their sensing range. Inductive proximity sensors work by generating an electromagnetic field around the active surface of the sensor. When a metal object comes into the sensor's detection range, the metal object interacts with the electromagnetic field, causing eddy currents to flow within the metal. These eddy currents, in turn, create a secondary electromagnetic field that opposes the original field generated by the sensor.

The sensor detects this change in the electromagnetic field and triggers an output signal. The size and composition of the metal object determine the strength of the eddy currents, and consequently, the magnitude of the secondary electromagnetic field. This information can be used to determine the proximity and size of the metal object.

Figure 6A:
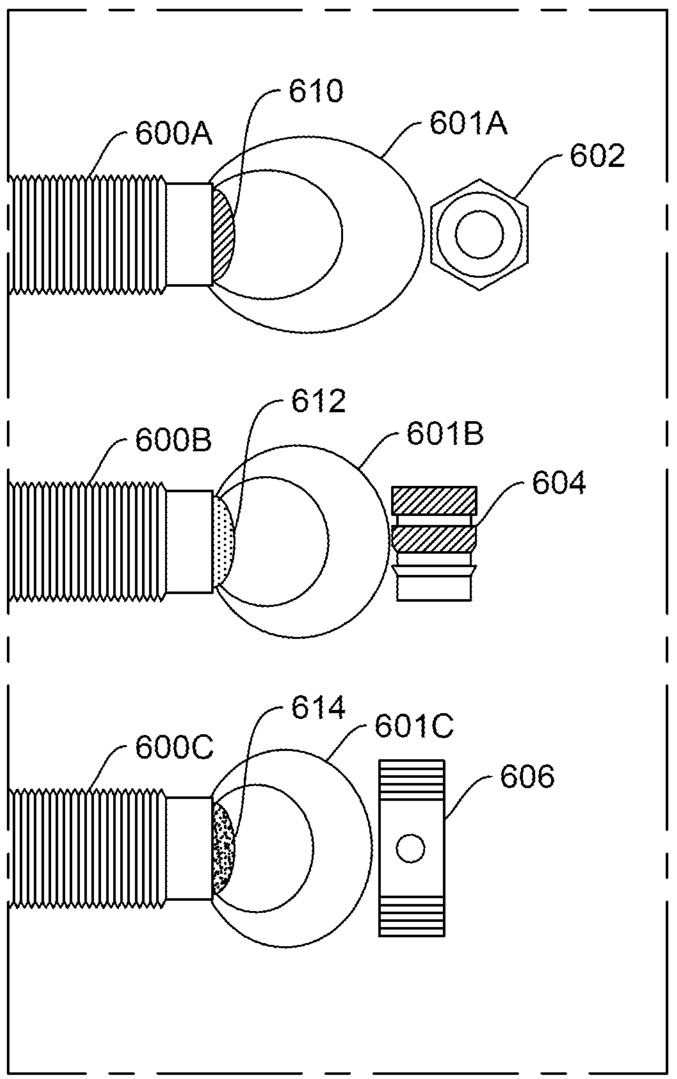
FIG. 6A is a side view various sensors with capabilities shown, according to an embodiment.
Figure 6B:
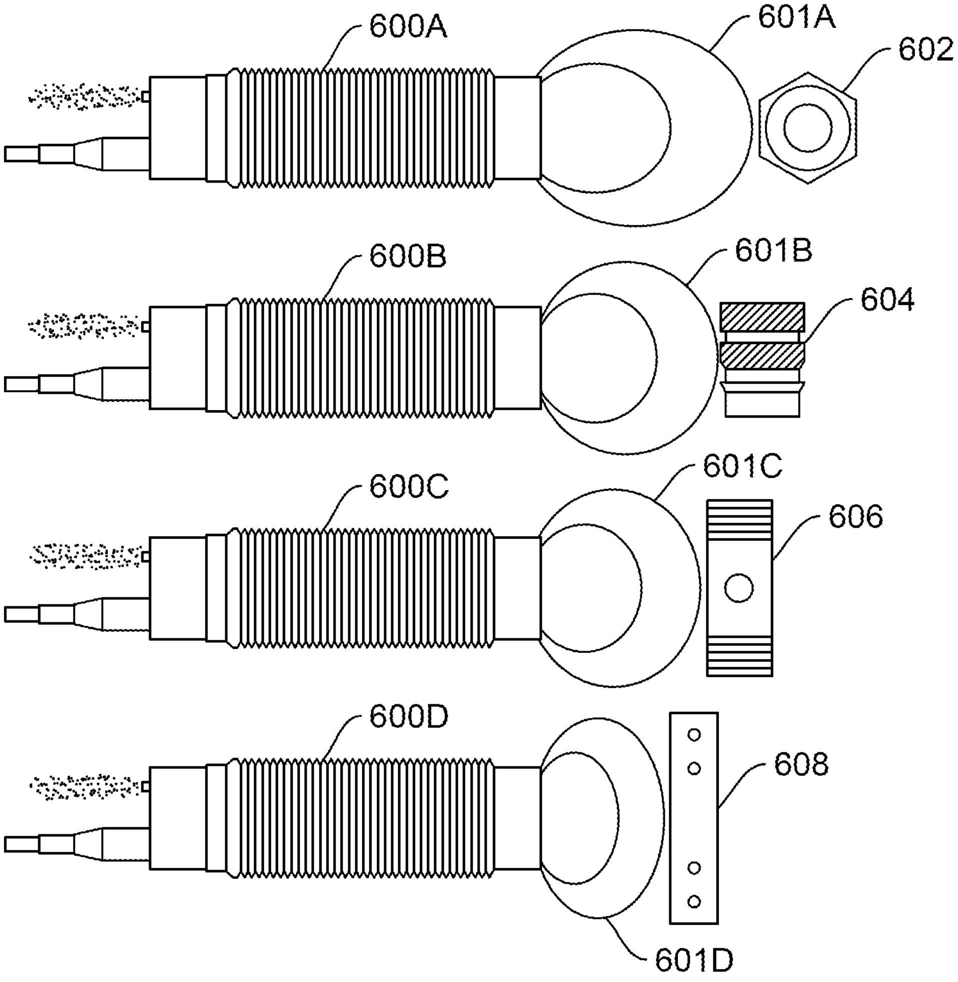
FIG. 6B is a side view of various sensors sensing various materials, according to an embodiment.

Turning now to FIGS. 6A-6B, proximity sensors are shown. Inductive proximity sensors have various benefits in the present disclosures, including their ability to operate in a variety of working environments in which they are exposed to dirt 610, grease 612, and grime 614. The functionality of sensor 600A, 600B, 600C, 600D is not appreciably decreased by the presence of these external elements. Sensor 600A, 600B, 600C, 600D may be used to detect the presence of steel 602, brass 604, aluminum 606, and copper 608 through the electromagnetic field 601A, 601B, 601C, 601D.

Hall-effect sensors can also be used to detect changes in the magnetic field caused by a nearby metal object and are commonly found in automotive and industrial applications. Hall-effect sensors work by detecting changes in the magnetic field caused by a nearby magnet or a current-carrying conductor. The sensor consists of a thin rectangular semiconductor material that has a small strip of metal on one side, which acts as the sensor's contact surface.

When a magnetic field is present perpendicular to the semiconductor material and the metal strip, it causes a buildup of charge carriers on one side of the semiconductor and a corresponding depletion of charge carriers on the other side.

The resulting voltage difference between the two sides of the semiconductor is proportional to the strength of the magnetic field. This voltage is measured by the sensor and can be used to determine the presence and strength of the magnetic field.

Alternatively, magnetic sensors can detect changes in magnetic fields caused by metal objects in their vicinity. Magnetic sensors work by detecting changes in magnetic fields caused by nearby magnetic or ferromagnetic materials. These sensors typically consist of a magnetic field sensor and supporting electronics to process the signal (e.g., processor 112).

When a magnetic or ferromagnetic material is present within the sensing range of the sensor, it causes a change in the magnetic field, which is detected by the magnetic field sensor. The sensor then converts this change in magnetic field into an electrical signal, which is processed by the supporting electronics.

Depending on the type of magnetic sensor, different methods can be used to detect the changes in the magnetic field. For example, some magnetic sensors use magnetoresistive elements, which change their resistance in response to a magnetic field. Other magnetic sensors use Hall-effect sensors.

Ultrasonic sensors, meanwhile, use high-frequency sound waves to bounce off nearby objects and detect metal objects based on the sound waves that return. The sensor emits a sound wave at a frequency above the range of human hearing, typically around 40 kHz or higher. The sound wave then travels through the air and bounces off any objects in its path, including metal objects.

When the sound wave hits an object, it reflects back towards the sensor. The sensor detects the reflected sound wave and calculates the time it took for the wave to travel to the object and back. Using this time measurement and the speed of sound, the sensor can calculate the distance between the sensor and the object.

Ultrasonic sensors can operate in a variety of modes, including continuous, where the sensor continually emits sound waves and detects any objects in their path, or pulse, where the sensor emits a burst of sound waves at set intervals and detects any objects within the path of the burst.

In some embodiments, sensors 130, 132, and 134 are all the same type of sensor. However, in some embodiments, sensors 130, 132, and 134 may be different types of sensors. For example, sensor A 130 may be an inductive proximity sensor while sensors 132, 134 may be hall-effect sensors.

Figure 3A:
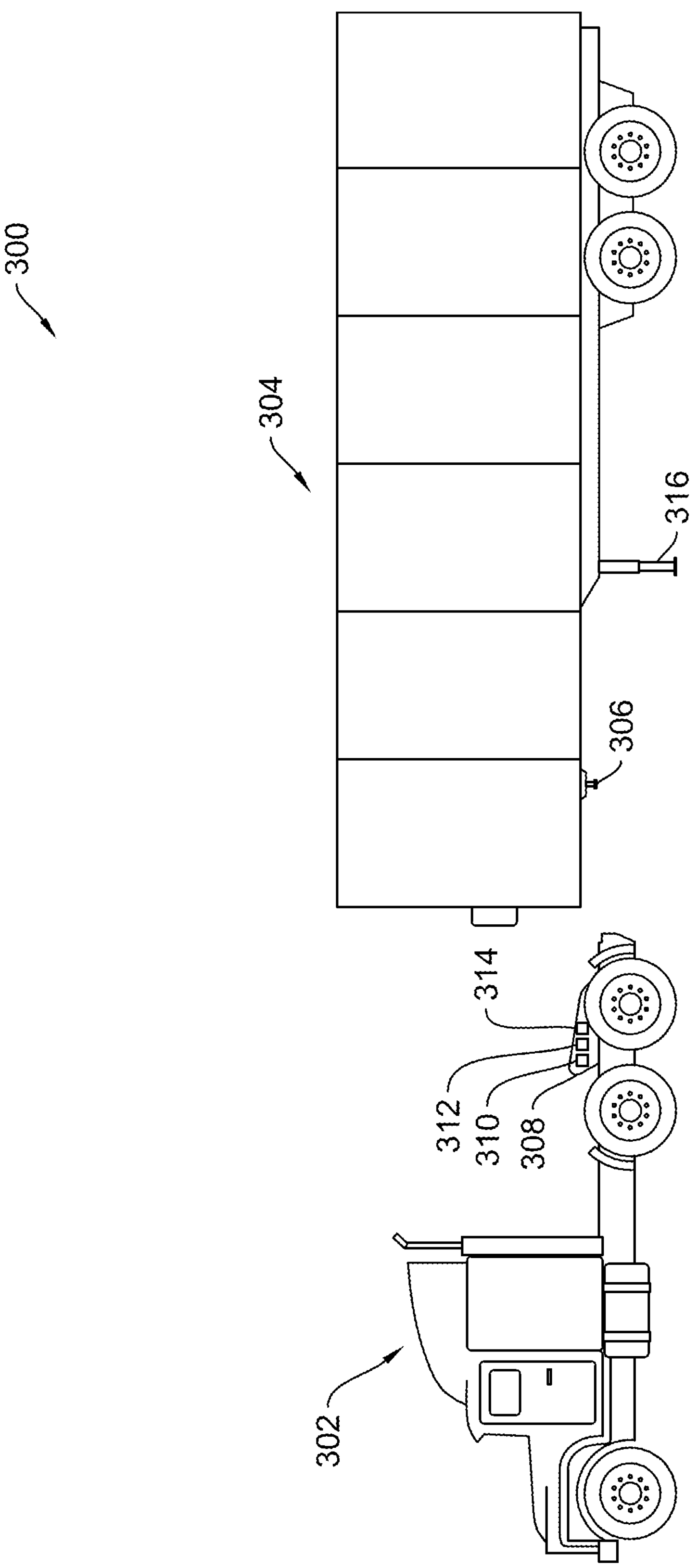
FIG. 3A is a left-hand view of a vehicle with the engagement verification system of FIG. 1, according to an embodiment.
Figure 3B:
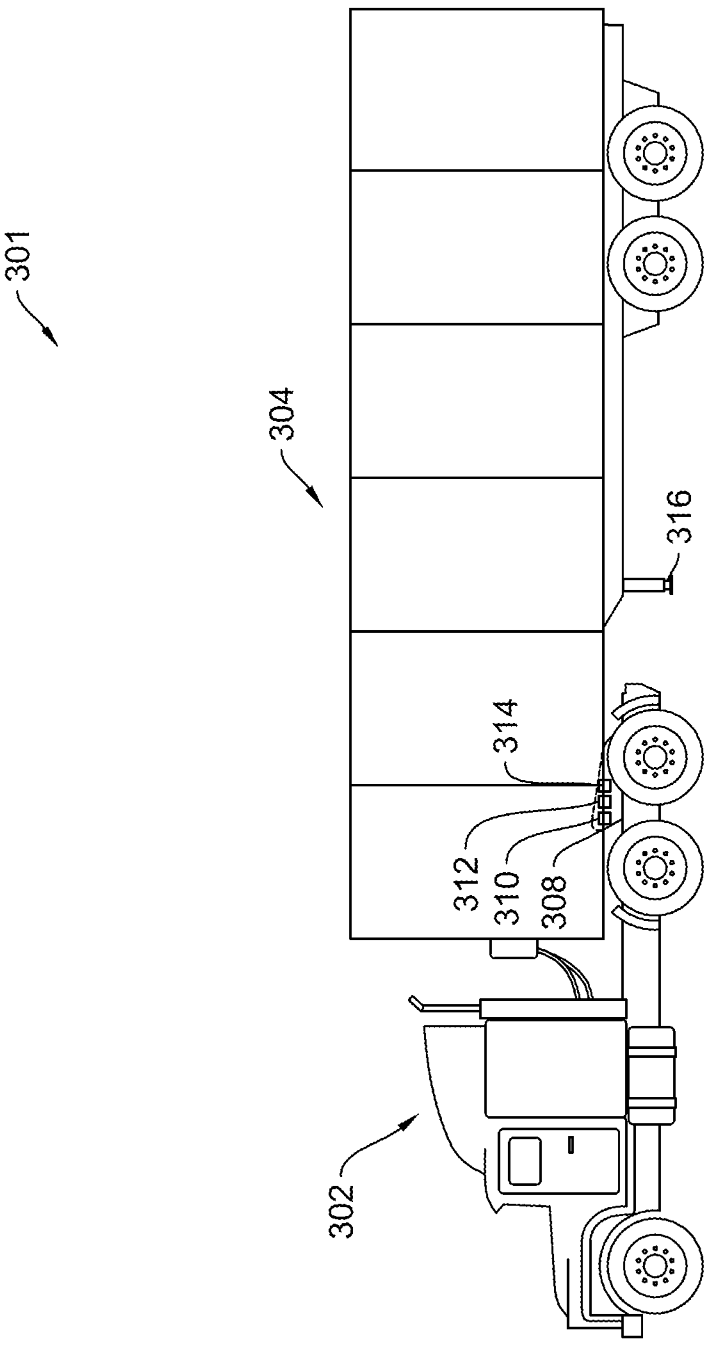
FIG. 3B is a left-hand view of a vehicle with the engagement verification system of FIG. 1, according to an embodiment.

In an embodiment, sensor A 130 is used to sense the presence of a coupling unit (e.g., coupling unit 306 of FIG. 3A-B). The coupling unit 306, in some embodiments, is a king pin of trailer. The coupling receiver 104 is configured to receive the coupling unit 306 and lock it in place. In some embodiments, the coupling receiver 104 is fifth-wheel hitch of a tractor trailer. In other embodiments, the coupling receiver 104 is a ball hitch, a pintle hitch, a gooseneck hitch, a weight distribution hitch, a bumper hitch, a tow bar, and a tow hook.

Figure 4:
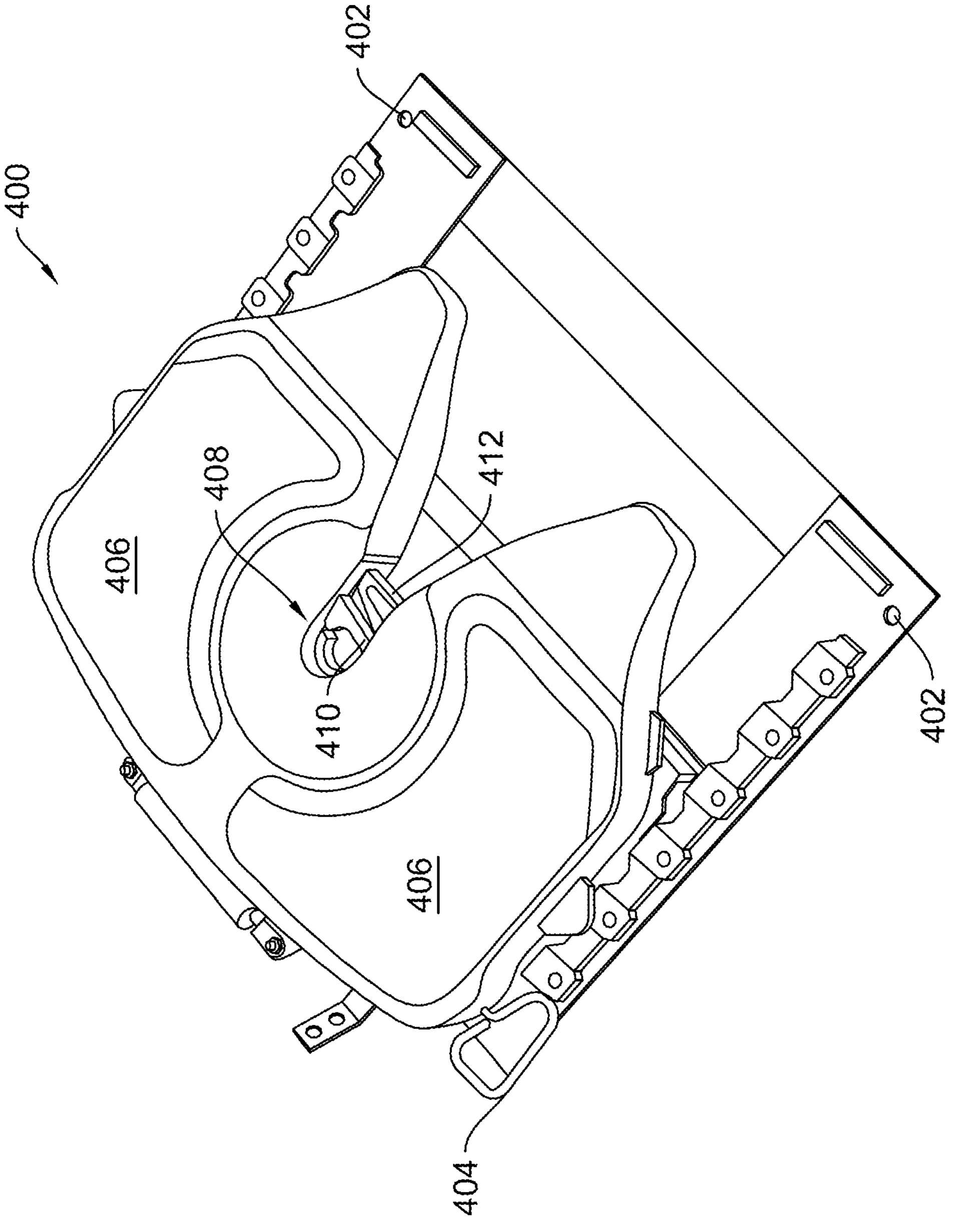
FIG. 4 is a perspective view of a coupling receiver, according to an embodiment.
Figure 5A:
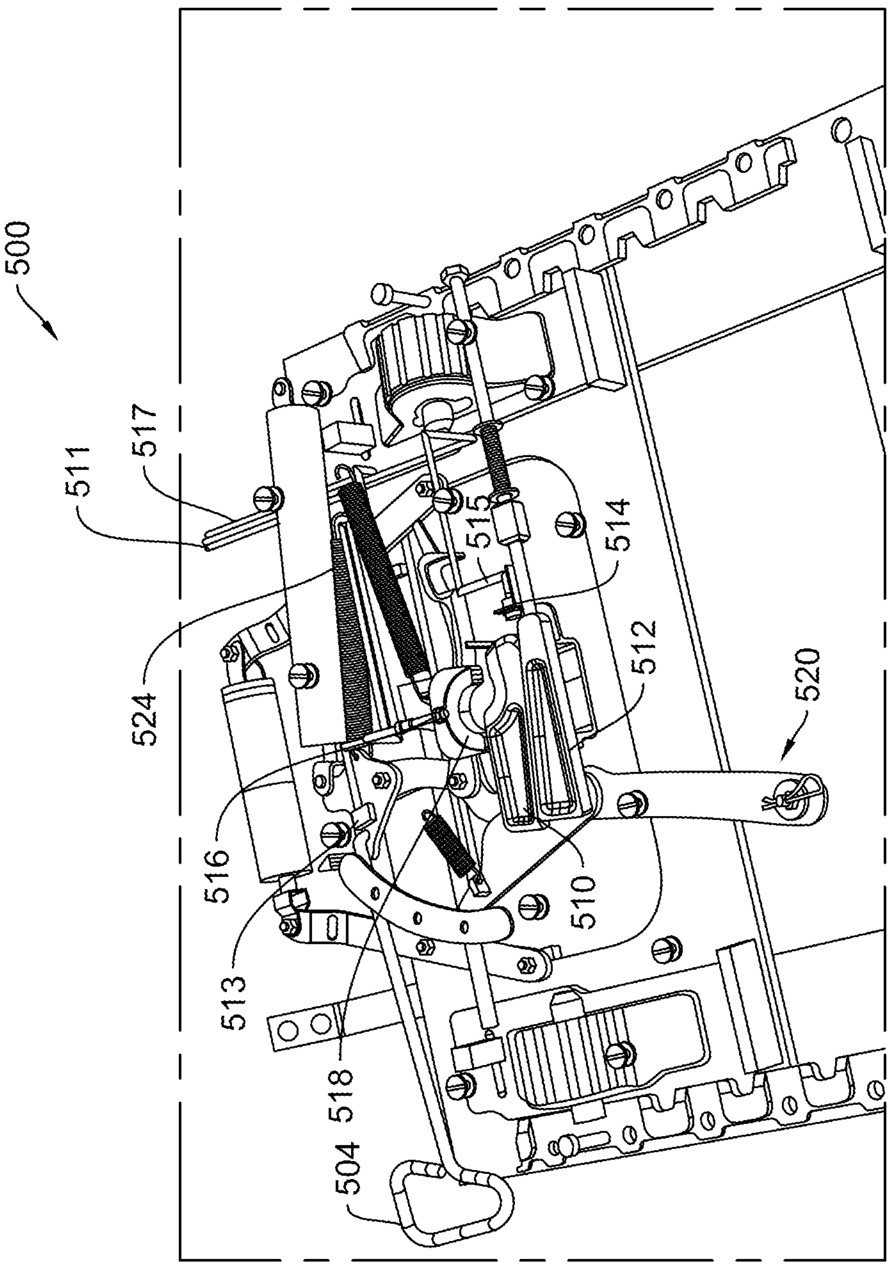
FIG. 5A is a perspective view of the internal components of a coupling receiver of the engagement verification system of FIG. 1, according to an embodiment.
Figure 5B:
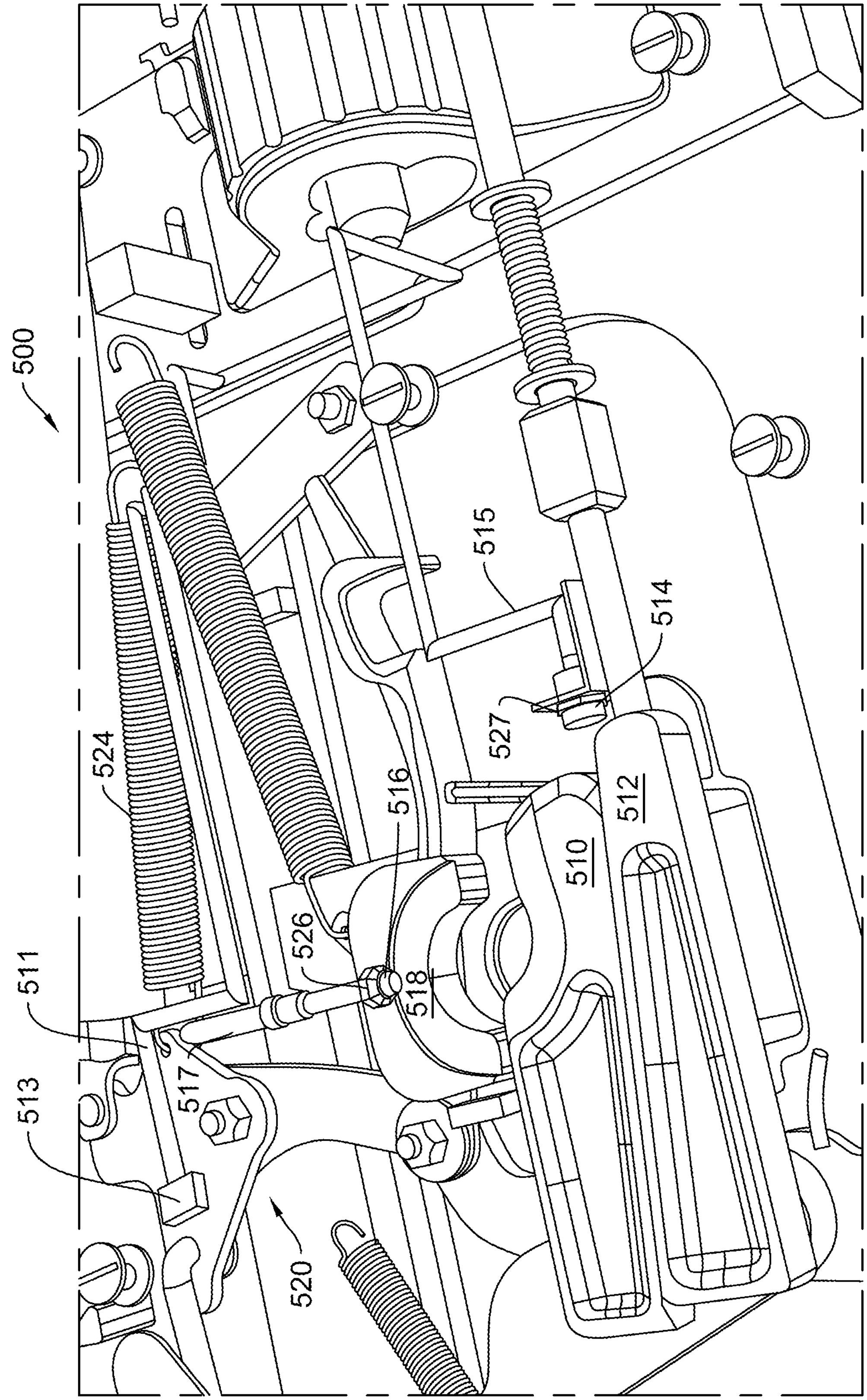
FIG. 5B is a perspective view of the internal components of the coupling receiver of FIG. 5A, according to an embodiment.
Figure 5C:
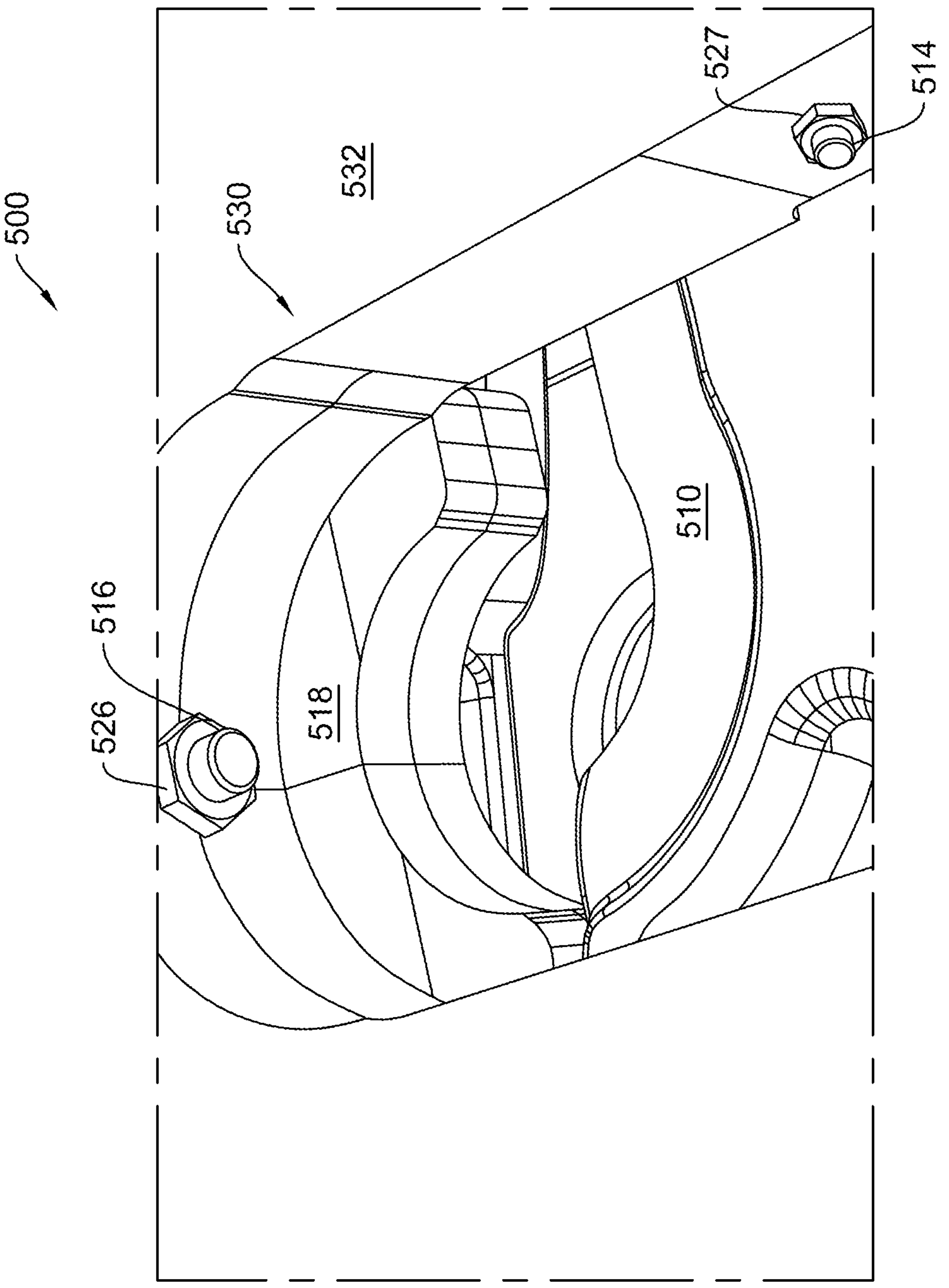
FIG. 5C is a perspective view of the throat of the coupling receiver of FIG. 5A, according to an embodiment.
Figure 5D:
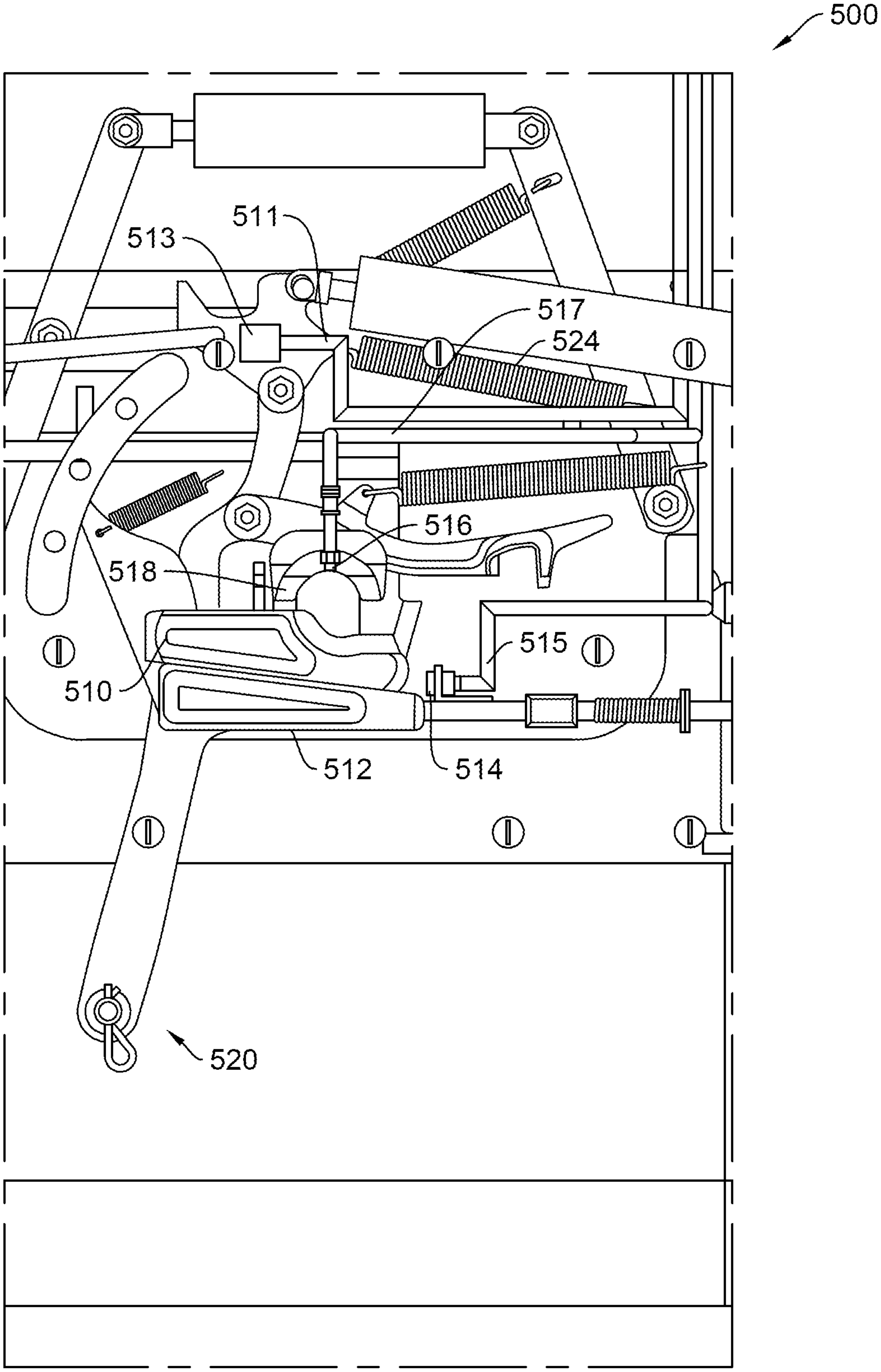
FIG. 5D is a top view of the internal components of the coupling receiver of FIG. 5A, according to an embodiment.

Sensor B 132 may be used to verify that the coupling receiver 104 is in a locked position around the coupling unit 306, as further described in FIGS. 4-5D.

Sensor C 134 may be used to verify that a manual release lever (e.g., manual actuator 504) is in the locked position, as further described in FIGS. 4-5D.

Turning now to FIG. 4, a fifth-wheel hitch 400 is shown as an embodiment of the coupling receiver 104 of FIG. 1. The fifth-wheel hitch 400 comprises at least one mounting point 402. The least one mounting point 402 is configured to accept a bolt or other mounting hardware to cooperatively couple the fifth-wheel hitch 400 to the vehicle. In an embodiment, the fifth-wheel hitch 400 is coupled to a tractor trailer. While a fifth-wheel hitch 400 is illustrated and described herein, it should be understood that the concepts and features of the present disclosure extend to any and all coupling receivers as described herein and elsewhere.

Fifth-wheel hitch 400 further includes top plates 406. Top plates 406 are configured so as to allow the trailer to rest thereon. In some embodiments, top plates 406 include integrated grooves to allow for grease to be placed therein to provide lubrication between the trailer and the top plates 406. This lubrication aids rotation of the trailer with respect to the fifth-wheel hitch 400 during operation. Fifth-wheel hitch 400 includes a throat 408, into which the coupling unit (e.g., the king pin) may engage. Locking jaw 412 and engaging jaw 410 may cooperatively engage to lock the king pin into the throat 408. In some embodiments, only one jaw 410, 412 is needed to lock the king pin into the throat 408. According to an embodiment, the jaws 410, 412 may be autonomously engaged to lock the king pin into the throat 408. The virtual driver system 116 of FIG. 1 may contain instructions that allow for the autonomous locking of jaws 410, 412 into place. For example, upon the processor 112 receiving a signal that sensor A 130 senses the presence of the coupling unit (e.g., the king pin), the processor 112 may transmit a signal to the control system 120 to engage the jaws 410, 412 of FIG. 4. Upon engaging them, sensor B 132 may transmit a signal indicating that the jaws 410, 412 are fully engaged and locked into position. The processor 112 then transmits instructions to control system 120 to allow the operation of the driveline 122.

The jaws may be actuated autonomously through the use of a hydraulic system on vehicle 102. The hydraulic system may use cylinders and pistons to linearly actuate the jaws 410, 412 against each other to lock them into place. Alternatively, the jaws may be rotated into place using the vehicle 102 hydraulic system.

In other embodiments, the jaws 410 may be actuated pneumatically (e.g., using the air compression system of vehicle 102), electromagnetically (e.g., using solenoids or relays), or electromechanically (e.g., using a motor, ball screw, lead screw, etc.).

Turning now to FIG. 5A, in internal view of a coupling receiver 500 is shown. Coupling receiver 500 is an embodiment of coupling receiver 104 of FIG. 1. Coupling receiver 500 may include an engaging jaw 510, a locking jaw 512, coupling unit sensor 516, a jaw sensor 514, a manual lock sensor 513, data cable 515, data cable 517, data cable 511, backing plate 518, manual actuator 504, and actuating mechanism 520.

Coupling unit sensor 516 may be configured to sense the presence of a coupling unit (e.g., a king pin) in the throat of coupling receiver 500 (e.g., in the throat 408 of FIG. 4). Coupling unit sensor 516 may be an inductive proximity sensor, according to an embodiment, and may be able to sense the inductive capacitance of a metal coupling unit once the coupling unit is within range of the coupling unit sensor 516. Coupling unit sensor 516 then transmits a signal through data cable 517 to a processor (e.g., processor 112 of FIG. 1). The coupling unit sensor 516 transmits an engaged status when the coupling unit is engaged with the throat of the coupling receiver 500 and the coupling unit sensor 516 senses the coupling unit in the throat of the coupling receiver 500. The coupling unit sensor 516 is configured to return a non-engaged status when the coupling unit is not sensed in the throat.

Jaw sensor 514 functions substantially in the same manner as coupling unit sensor 516, in some embodiments. In some embodiments, the jaw sensor 514 is an inductive proximity sensor. The jaw sensor 514 may be configured to sense the proximity of engaging jaw 512. The jaw sensor 514 is placed in relation to the locking jaw 512 so that the jaw sensor 514 senses the proximity of locking jaw 512 when locking jaw 512 is in the locked position. Locking jaw 512 is in the locked position, in the embodiment illustrated in FIG. 5A, when the locking jaw 512 is shifted to the right, in proximity of the jaw sensor 514. The locking jaw 512 is unlocked (i.e., non-engaged) when the locking jaw 512 is laterally shifted to the left. The locking jaw 512 is unengaged by actuating the actuating mechanism 520. One method of actuating mechanism 520 is by pulling the manual actuator 504 to the left. However, actuating mechanism 520 may be coupled to any actuating member (e.g., hydraulic, electrical, mechanical, pneumatic) that may actuate the actuating mechanism 520. Actuating mechanism 520 may be spring loaded to a biased position (e.g., engaged or non-engaged). In some embodiments, the engaging jaw 510 and locking jaw 512 are autonomously engaged and disengaged by the virtual driver system 116.

The jaw sensor 514 is configured and placed on the coupling receiver 500 at the entrance of the throat so as to not return/transmit a false positive signal due to the presence of the coupling unit within the throat of the coupling receiver 500. In some embodiments, the jaw sensor 514 is a limit switch that detects the presence of the engaging jaw 510 or locking jaw 512 based on the engaging jaw 510 or locking jaw 512 being in physical contact with the jaw sensor 514.

Jaw sensor 514 transmits the engagement status to the processor through data cable 515. In some embodiments, jaw sensor 514 communicates with the processor wirelessly instead of by data cable 515.

Manual lock sensor 513 is configured to sense the position of actuating mechanism 520. Manual lock sensor 513 may be cooperatively coupled to the actuating mechanism 520 or the coupling receiver 500. In either embodiment, the manual lock sensor 513 senses an engagement of the actuating mechanism 520. In some embodiments, manual lock sensor 513 is not utilized in the engagement verification system. In some embodiments, the manual lock sensor 513 is a backup engagement verification. Manual lock sensor 513 is configured to sense that actuating mechanism 520 is in an engaged position, thus eliminating the chance of a false positive reading from jaw sensor 514. By verifying the overall engagement status with all three sensors 516, 514, 513, the operator or virtual driver system may be able to ensure that the coupling unit is securely engaged in coupling receiver 500 and locked into position. Manual lock sensor 513 transmits the engagement status to the processor by data cable 511. As with the other sensors 514, 516, manual lock sensor 513 may communicate with the processor wirelessly instead of by data cable 511. FIG. 5B illustrates the throat of coupling receiver 500 of FIG. 5A in greater detail.

Backing plate 518 may be positioned to interface with the coupling unit to protect the coupling unit sensor 516 from receiving an unanticipated collision from the coupling unit. In some embodiments, the backing plate 518 is proud of the coupling unit sensor 516, thus protecting it.

Turning now to FIG. 5C, the throat 530 of the coupling receiver 500 of FIG. 5A is shown. Coupling unit sensor 516 and jaw sensor 514 are shown mounted to the top plate 532 of coupling receiver 500. In some embodiments, the sensors 516, 514 are fixedly or removeably mounted to an inner surface (i.e., in the throat) of the top plate 532 through the use of locking nuts 526, 527. The top plate 532 has two holes through which the sensors 516, 514 may protrude. As described herein, backing plate 518 may protrude proud of coupling unit sensor 516 to prevent rapid unscheduled disassembly of the coupling unit sensor 516 by the coupling unit 306 upon the vehicle applying a braking force. FIG. 5D illustrates the internal components of coupling receiver 500 from a top-view perspective. In some embodiments, the jaw sensor 514 is positioned at the entrance of the throat configured to proximally sense the locking jaw 512 in the engaged (e.g., locked) position. However, in some embodiments, the jaw sensor jaw sensor 514 is configured to proximally sense the engaging jaw 510 in the engaged (e.g., locked) position. When the locking jaw 512 and engaging jaw 510 are both in the engaged position, the coupling unit may be locked into position between the backing plate 518 and engaging jaw 510. In this locked position, jaw sensor 514, locking jaw 512, and manual lock sensor 513 all transmit to the virtual driver system 116 or controller 108 an engaged status, and the processor 112 executing the virtual driver system 116 transmits instructions to the control system 120 to operate the vehicle (e.g., vehicle 102 of FIG. 1).

Returning now to FIG. 1, upon the virtual driver system 116 receiving the sensor data from sensors 130, 132, 134, the processor 112 executing virtual driver system 116 may determine an overall engagement status of the coupling receiver 104 (e.g., coupling receiver 500 of FIGS. 5A-5D or coupling receiver 308 of FIG. 3). In some embodiments, the engagement status is binary. For example, the coupling unit is either fully engaged and locked with the coupling receiver 104 or the coupling unit is not fully engaged and locked with the coupling receiver 104. In this embodiment, sensors 130, 132, 134 are configured to transmit to virtual driver system 116 an engagement signal (e.g., the presence of the coupling unit, a locked position, etc.). If all three sensors 130, 132, 134 transmit an engagement signal, then the virtual driver system 116 determines that the coupling receiver 104 is coupled to the coupling unit. Upon determining engagement, the processor 112, in executing the virtual driver system 116, transmits a signal to the control system 120 to allow the driveline 122 of vehicle 102 to operate. If any one of the sensors 130, 132, 134 transmits a signal of non-engagement, then processor 112 transmits a signal to the control system 120 to not allow the driveline 122 of the vehicle 102 to operate.

In some embodiments, the virtual driver system 116 may have multiple drive modes. For example, the virtual driver system 116 may have a non-coupled mode (e.g., operating the vehicle 102 without an accessory coupled to the vehicle 102), a coupling mode (e.g., attempting to couple an accessory to the vehicle 102 via the coupling receiver 104), a coupled mode (e.g., operating the vehicle 102 when coupled to an accessory), and an override mode (e.g., to manually override the safety protocols of virtual driver system 116).

In the non-coupled mode, the virtual driver system 116 may or may not receive transmitted information from the sensors 130, 132, 134. The virtual driver system 116 will not determine the engaged status of the sensors 130, 132, 134 or the coupling receiver 104. The virtual driver system 116 will allow the operator or vehicle 102 to operate the vehicle 102 without restrictions. This applies to whether the vehicle 102 is manually or autonomously operated (e.g., without human intervention). The operator may selectively determine, through the user interface 140 or remote user device 136 the mode in which the vehicle 102 will be operated (whether manually or autonomously). In some embodiments, the controller 108 may autonomously determine what mode to operate the vehicle 102 in. The remote user device 136 or user interface 140 may display the operating mode for the operator. In some embodiments, the operator may choose the mode through the use of the remote user device 136 or user interface 140.

In the coupling mode, the virtual driver system 116 will begin receiving and/or communicating the engagement status from the sensors 130, 132, 134. The processor 112 may also transmit instructions to the user interface 140 to display the engagement status to an operator of vehicle 102. The user interface 140 may then display the engagement status. The status may be displayed to the user visually (e.g., with a lock icon or unlock icon, with colors, flashing lights, text, etc.), aurally (e.g., beeping, tones, diction, etc.), or haptically (e.g., vibrations, etc.). In some embodiments, the user interface 140 displays to the operator the engagement status of each sensor 130, 132, 134. In some embodiments, the user interface 140 displays the overall status of the coupling unit based on the engagement status of each sensor 130, 132, 134.

The user interface 140 may display red when any one of the three sensors 130, 132, 134 transmits a non-engaged status. Upon all three sensors 130, 132, 134 transmitting an engaged status (i.e., the coupling unit is in the throat of the coupling receiver 104, the jaws of the coupling receiver 104 are fully engaged and in the locked position, and the manual release lever and actuating mechanism are in the locked and engaged position), then the display may present a green screen, a locked icon, or a green lock icon. In some embodiments, if at least one of the sensors 130, 132, 134 (but not all) transmit an engaged status, then the user interface 140 will display yellow, or a yellow icon. In other embodiments, any color or icon may be used to communicate to the operator the engagement status of the coupling unit.

In some embodiments, the feedback to the operator regarding the engagement status of the coupling receiver 104 is aural. In this embodiment, the user interface 140 may generate various audio signals to communicate to the operator the engagement status of the coupling receiver 104. For example, upon the virtual driver system 116 being put into the coupling mode, the user interface 140 may begin beeping. Once the sensors 130, 132, 134 all transmit an engaged status, the user interface 140 may begin playing a solid tone. In some embodiments, the user interface 140 may emit diction with preselected phrases to communicate to the operator the status of each sensor 130, 132, 134. For example, the user interface 140 may emit the phrase, "king pin detected," when the coupling unit is detected by sensor 516. The user interface 140 may then emit the phrase, "jaws engaged," when jaw sensor 514 senses and transmits the engagement of locking jaw 512 and/or engaging jaw 510. The user interface 140 may then emit the phrase, "manual release engaged," when manual lock sensor 513 senses and transmits that actuating mechanism 520 is in the engaged and locked position. The previous examples are for example purposes only, and it should be understood that the virtual driver system 116 may transmit instructions to the user interface 140 to emit any phrase, in any language, in any voice, to communicate relevant engagement information to an operator of vehicle 102.

In some embodiments, the user interface 140 may emit haptic feedback to the operator upon entering the coupling mode. For example, upon entering into the couple mode, the user interface 140 may vibrate (either pulsing or continuously) until the sensors 130, 132, 134 detect and transmit to the controller 108 an engaged status. Upon the sensors 130, 132, 134 sensing and transmitting to the controller 108 an engaged status, the user interface 140 may adjust the haptic feedback to indicate an engaged status. For example, the user interface 140 may adjust from a pulsing vibration to a continuous vibration. In other embodiments, the user interface 140 may adjust from a continuous vibration to a pulsing vibration. In some embodiments, a steering mechanism is the user interface 140. In other embodiments, the seat is the user interface 140. However, the user interface 140 may be any device or element of the vehicle 102 or remote user device 136 to which the user is in physical contact during the coupling mode.

In some embodiments, the user interface 140 may communicate one or more of the previously described examples to the operator concurrently (e.g., both audio and visual communication).

Upon receiving the indication during the coupling mode that the coupling unit is fully engaged and locked into the coupling receiver 104, the virtual driver system 116 may enter into the coupled mode. In some embodiments, the virtual driver system 116 may only enter into the coupled mode if the sensors 130, 132, 134 are transmitting an engaged status. In autonomous embodiments, the virtual driver system 116 automatically enters into the coupled mode upon receiving an engaged status from sensors 130, 132, 134 during the coupling mode.

In some embodiments, if the operator attempts to enter into the coupled mode from the coupling mode prior to the virtual driver system controller 108 receiving an indication of engagement, the processor 112 may transmit instructions to the control system 120 to not allow the vehicle 102 to operate. The operator may be required to reenter coupling mode and attempt to couple the accessory again. In some embodiments, the vehicle 102 may be bounded to a location (e.g., a tractor trailer hub parking lot) when in the coupling mode, and the operating parameters (e.g., speed) may be limited while in coupling mode. This may ensure that once the virtual driver system 116 enters coupling mode, the accessory is fully engaged and locked to the coupling receiver 104 prior to leaving the geofenced area. In other embodiments, the coupling mode does not limit vehicle 102 operating parameters or location.

When in coupled mode, any restrictions during coupling mode may be removed from vehicle 102. For example, vehicle 102 may operate at full speed and leave any geofence restrictions. The vehicle 102 may travel to its final destination with the accessory fully engaged and locked to the coupling receiver 104. However, in some embodiments, certain restrictions may be placed on the vehicle 102 during coupled mode to restrict maneuverability, depending on the accessory coupled to vehicle 102 via the coupling receiver 104. For example, when the vehicle 102 is a tractor trailer and the accessory is a trailer, the maximum speed of the prime mover (e.g., engine) may be limited to avoid overheating. In other embodiments, the maximum ground speed may be limited to allow for safe stopping distances, based on the weight of the payload of the accessory. In other embodiments, steering angles may be limited to avoid jackknifing the trailer. In other embodiments, remote operator requirements may change based on the coupled status. For example, once the vehicle 102 is in the coupled mode, a remote operator using remote user device 136 may be required to perform a safety check remotely. In other embodiments, an operator overseeing the autonomous operation of vehicle 102 in coupled mode may need to have certain credentials above an operator overseeing the autonomous operation of vehicle 102 in non-coupled mode. For example, a more experienced operator may be required to oversee the autonomous operation of vehicle 102 when a trailer is coupled to the vehicle 102. This may be caused by the increased risk for personal or monetary injury when operating a payload. The above examples are for example purposes only, and should not be considered limiting, and it should be understood that various other restrictions may be placed on the vehicle 102 by the virtual driver system 116 during the coupled mode.

In the override mode, the operator or autonomous system (e.g., in some embodiments, the virtual driver system 116) may override the safety or limiting protocols of the previous modes. For example, an operator may choose to enter into the override mode of the virtual driver system 116 to remove the geofence or speed limits of the coupling mode. In other embodiments, the operator or virtual driver system 116 may choose to remove the steering limits of the coupled mode to make a specific turn.

In some embodiments, the operator must input a code (e.g., a password) to enter into the override mode. In other embodiments, an operator must have certain credentials (e.g., be a manager or IT personnel) before being able to override the virtual driver system 116 safety protocols.

Turning again to FIG. 1, the sensors 130, 132, 134 may be communicably coupled to the controller 108 or virtual driver system 116 wired or wirelessly. The wireless connection may be a wireless communication signal (e.g., Wi-Fi, cellular, LTE, 5G, etc.). In some embodiments, the sensors 130, 132, 134 are communicably coupled to the controller 108 by means of the vehicle 102 CAN bus. Additionally, the sensor data may be communicated, by the controller 108 to the network 106 by way of a network interface. Through network 106, the sensor data from sensors 130, 132, 134 may be stored and/or accessed by database 138 and remote user device 136.

In other embodiments, the virtual driver system 116 need not receive an engagement signal from each sensor 130, 132, 134 in order to transmit a signal to control system 120 to allow the driveline 122 of vehicle 102 to operate. For example, a coupling receiver 104 may not have all three sensors 130, 132, 134. Instead, the coupling receiver 104 may only have sensors 130, 132. In other embodiments, the virtual driver system 116 may only need two of the three sensors to show an engagement status. For example, sensor 134 may be a backup sensor to be used if one of the other sensors is not working.

In some embodiments, the user interface 140 may be used to display the engagement status of sensors 130, 132, 134. Each sensor 130, 132, 134 may transmit its engagement status to the controller 108. Processor 112 of controller 108 may transmit instructions to display the engagement status of each sensor 130, 132, 134 to the user interface 140. Upon receiving the instruction to display engagement status, user interface 140 may display a graphical user interface displaying the engagement status of each sensor 130, 132, 134. In some embodiments, the GUI will also display an overall engagement status, depending on the combined status of each sensor 130, 132, 134. For example, the overall engagement status may show engaged when each sensor 130, 132, 134 transmits an engaged status. The overall engagement status may show non-engaged when at least one of the sensors 130, 132, 134 transmits a non-engaged status. In other embodiments, the GUI may display the overall engagement status depending on the virtual driver system 116 protocol which determines the engagement status based on engagement status of the sensors 130, 132, 134.

While three separate sensors 130, 132, 134 are described in some of the embodiments of the present disclosure for example purposes, it should be understood that in other embodiments a different number of sensors may be used. For example, in some embodiments, only one sensor may be used. In others, two sensors may be used. In others, four or more sensors may be used. The number of sensors described in various embodiments should not be construed as limiting in any way.

Upon determining an engagement status, the processor 112 transmits a signal to control system 120 to allow or not allow the driveline 122 to be operated, depending on the engagement status.

The control system 120 for the vehicle 102 is a system that manages and regulates the operation of various subsystems within the vehicle (e.g., prime mover 124 and braking system 126). These subsystems may also include the engine, transmission, steering, brakes, and suspension, among others. The control system is responsible for monitoring the behavior of these subsystems, making adjustments as necessary, and ensuring that the vehicle operates safely and efficiently.

The control system uses various sensors (e.g., sensors 130, 132, 134) and actuators to gather information about the state of the vehicle and to make adjustments to its behavior. For example, a sensor might detect that the vehicle is traveling too fast, and send a signal to the engine to reduce its power output. Similarly, an actuator might be used to adjust the position of the steering mechanism in response to changes in the road conditions.

In some embodiments, the controller 108 is integrated in control system 120. In other embodiments, the controller 108 and control system 120 are distinct components within vehicle 102. Control system 120 is configured to communicate information to controller 108, such as operating parameter status of the various subsystems of driveline 122 (e.g., engine speed of prime mover 124, braking output for braking system 126, steering angle, temperature of prime mover 124, etc.).

In some embodiments, the virtual driver system 116 may be hosted on remote user device 136 or database 138. The processor 112 may access the virtual driver system 116 from database 138 or remote user device 136 through network 106. In other embodiments, controller 108 is integral to remote user device 136. In such embodiments, processor 112 transmits instructions to control system 120 through network 106 to operate the driveline 122 of vehicle 102. Virtual driver system 116 may be executed autonomously by controller 108 or may require additional user/operator input. For example, an operator of vehicle 102 may be required to accept or verify instructions from the processor 112 executing virtual driver system 116.

In some embodiments, the operator may override the instructions from processor 112 executing virtual driver system 116. For example, the operator may override the instructions to not allow operation of the vehicle 102 through the user interface of vehicle 102. In other embodiments, the operator is remote from vehicle 102 and may override the instructions by the remote user device 136.

Figure 2:
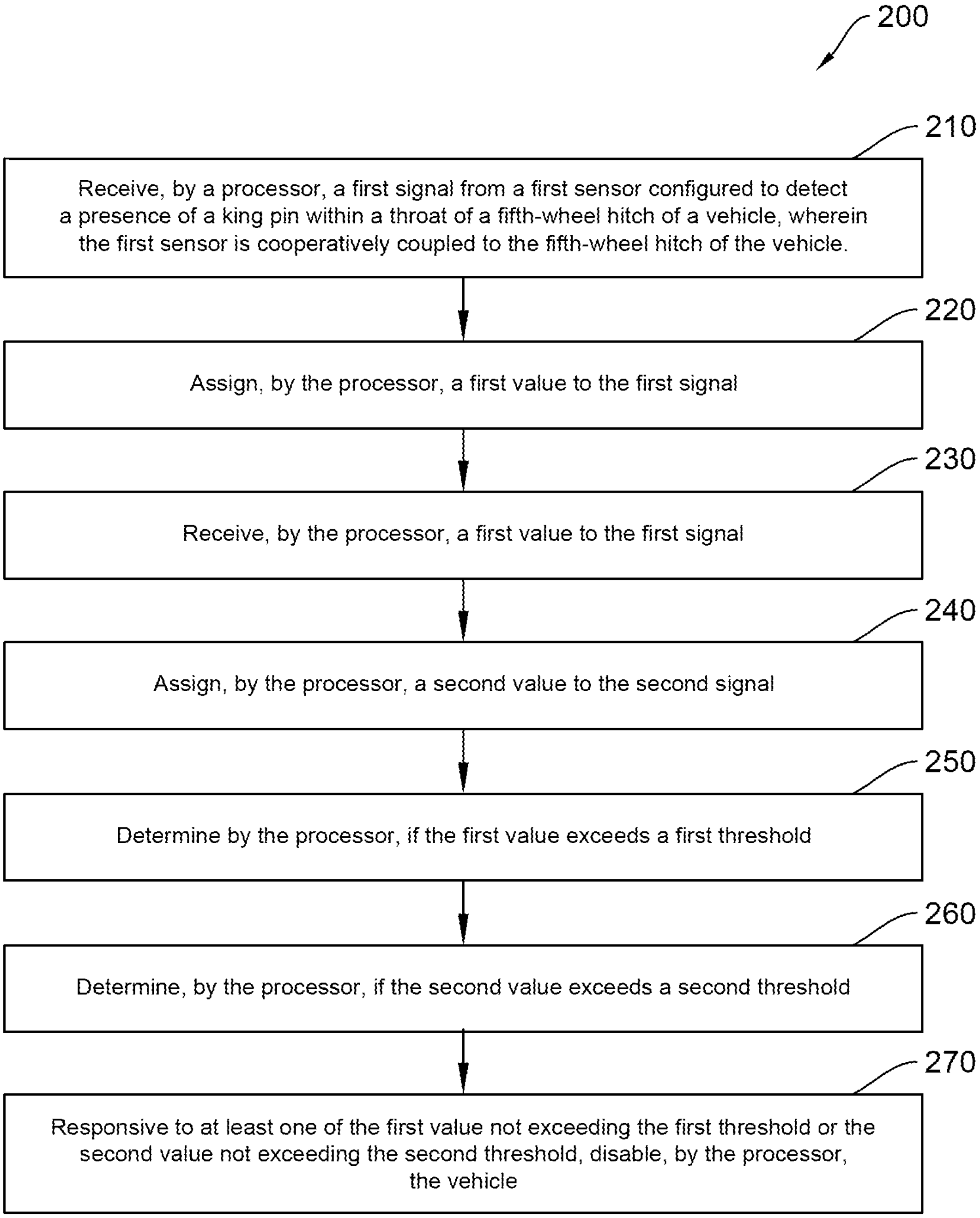
FIG. 2 is a flow diagram of a method of implementing the engagement verification system of FIG. 1, according to an embodiment.

FIG. 2 shows the steps of a processor executing the virtual driver system 116 according to an embodiment. The method 200 shown in FIG. 2 comprises step 202, step 204, step 206, step 208, step 210, step 212, and step 214. However, it should be appreciated that other embodiments may comprise additional or alternative steps, or may omit one or more steps altogether. It should also be appreciated that other embodiments may perform certain steps in a different order. Steps discussed herein may also be performed simultaneously or near-simultaneously. Although the steps are shown in FIG. 2 having a particular order, it is intended that the steps may be performed in any order. It is also intended that some of these steps may be optional.

At step 210, the processor receives a first signal from a first sensor configured to detect a presence of a king pin within a throat of a fifth-wheel hitch of a vehicle, wherein the first sensor is cooperatively coupled to the fifth-wheel hitch of the vehicle. As disclosed herein, the sensors of the vehicle periodically communicate with the controller (including the processor). In such communications, the sensors transmit signals to the processor. These signals may be digital or analog. In step 210, the first sensor (e.g., a proximity sensor) may be coupled to the fifth-wheel hitch so as to be able to detect the presence of a king pin of a trailer within the throat of the fifth-wheel hitch. The first sensor can be mounted in any location on the fifth-wheel hitch or vehicle in order to detect the presence of the king pin. One embodiment is shown in FIGS. 4, and 5A-5D, as previously described herein.

The sensor may be any suitable sensor described previously. In other embodiments, the sensor may detect the king pin through a communication coupling. For example, the sensor may be a near-field communication ("NFC") reader. The king pin may be coupled with an NFC chip that may communicate to the reader (i.e., the sensor) when within the throat of the fifth-wheel hitch. The reader, upon receiving an indication that the NFC (and by extension, the king pin) is within the throat, may transmit the first signal to the processor.

At step 220, the processor assigns a first value to the first signal. In some embodiments, the processor may determine whether there is a king pin within the throat of the fifth-wheel hitch of the vehicle. For example, the processor may assign the first signal a "0" when the king pin is not sensed at all in the throat. As the king pin moves closer to the sensor, the sensor transmits a signal that increases in strength. In an example, the processor assigns values, increasing to "5."

At step 230, the processor receives a second signal from a second sensor configured to detect a jaw of the fifth-wheel hitch, wherein the second sensor is cooperatively coupled to the fifth-wheel hitch of the vehicle. In this step, the second sensor may function in substantially the same way as the first step. However, in some embodiments, the second sensor is a different variety of sensor and functions in a distinct manner. In this step, the second sensor detects the presence of the jaw in an engaged and locked position. This jaw may be any locking mechanism. In some embodiments, it is the engaging jaw 510 or locking jaw 512 of FIGS. 5A-5D. In other embodiments, the second sensor is configured to detect both the engaging jaw 510 and locking jaw 512 in the locked and engaged position.

At step 240, the processor assigns a second value to the second signal. In some embodiments, the processor may determine whether the jaw is in the engaged and locked position. For example, the processor may assign a "0" when the jaw is not in the engaged and locked position. As the jaw moves closer to the sensor, the sensor transmits a signal that increases in strength. In an example, the processor assigns values to the second signal, increasing to "5."

At step 250, the processor determines if the first value exceeds a first threshold. In one example, the processor may use a threshold (e.g., "4"). In such an embodiment, the processor compares the assigned value to the threshold and determines if the assigned value exceeds the threshold. In some embodiments, "exceeds" refers to above. In other embodiments, "exceeds" refers to below.

At step 260, the processor determines if the second value exceeds a second threshold. In one example, the processor may use a threshold (e.g., "4"). In such an embodiment, the processor compares the assigned value to the threshold and determines if the assigned value exceeds the threshold. In some embodiments, "exceeds" refers to above. In other embodiments, "exceeds" refers to below. It should be noted that the first and second threshold need not be the same value. The first and second thresholds may be unitless or may be assigned a unit.

At step 270, responsive to at least one of the first value not exceeding the first threshold or the second value not exceeding the second threshold, the processor disables the vehicle. In this embodiment, the processor disables, through a control system, the vehicle. In some embodiments, the entire vehicle is disabled to ensure that the king pin is fully hitched before the vehicle departs a coupling zone in which the trailer with the king pin is hitched to the vehicle. In some embodiments, only certain functionality of the vehicle is disabled. For example, the ground speed of the vehicle may be limited. In other embodiments, the vehicle may be geofenced to an area when the threshold is not exceeded. The vehicle may be limited in any manner disclosed herein.

FIGS. 3A-3B illustrates an embodiment of engagement verification system 100 of FIG. 1 with a coupling receiver 308 and coupling unit 306. In FIG. 3A, a disengaged system 300 is shown. The disengaged system 300 may include a vehicle 302 (e.g., a tractor trailer) and an accessory 304 (e.g., a trailer).

In some embodiments, the vehicle 302 may be a tractor trailer with a cooperatively integrated coupling receiver 308. As described in FIG. 1, the coupling receiver 308 may be any apparatus used for engaging with a coupling unit 306. As shown in FIGS. 3A-B, coupling receiver 308 may include a coupling unit sensor 310, a jaw sensor 312, and a manual lock sensor 314. Sensors 310, 312, 314 may be any type of sensor previously described in FIG. 1, or any other sensor known in the field.

Sensors 310, 312, 314 may be communicably coupled to a controller (such as controller 108 of FIG. 1) housed locally on the vehicle 302. Alternatively, or in addition, the sensors 310, 312, 314 may be wirelessly in communication with a remote user device (e.g., remote user device 136) or a remote database (database 138) through a network (e.g., network 106).

Accessory 304 may be a trailer with a coupling unit 306 and landing gear 316. In the disengaged system 300, the landing gear 316 may be in an extended position and in cooperation with the ground to support the accessory 304. In some embodiments, the coupling receiver 308 has one or more of the sensors 310, 312, 314. In the embodiment illustrated in FIG. 3A, the sensors 310, 312, 314 may return a non-engaged status to a processor. In some embodiments, the vehicle 302 may be in the coupling mode, as described above.

Turning now to FIG. 3B, an engaged system 301 is shown. In this embodiment, the accessory 304 is shown engaged with coupling receiver 308 of the vehicle 302. In this embodiment, the sensors 310, 312, 314 may transmit a signal to the processor that the coupling unit 306 (e.g., king pin) is engaged in the throat of the coupling receiver 308, the jaw(s) of coupling receiver 308 is/are fully engaged and locked, and the manual release mechanism (e.g., actuating mechanism 520 of FIGS. 5A-5D) is in the locked position.

In the engaged system 301, the landing gear 316 is in the retracted position and the accessory 304 rests on the coupling receiver 308 and is coupled to the coupling receiver 308 by the coupling unit 306 (shown in FIG. 3A). In this embodiment, the sensors 310, 312, 314 may transmit an engagement signal to the processor. For example, coupling unit sensor 310 may transmit a signal that the coupling unit 306 is detected in the coupling receiver 308. Jaw sensor 312 may transmit a signal that the jaw(s) of the coupling receiver 308 is/are in the engaged and locked position. And manual lock sensor 314 may transmit a signal that the manual release mechanism is in the locked position. In some embodiments, the coupling receiver 308 only has sensors 310, 312.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A method comprising:

setting, by a processor, a drive mode of a virtual driver system to a coupling mode of attempting to couple an accessory to an autonomous vehicle, the virtual driver system being hosted on a device remote from the autonomous vehicle, the autonomous vehicle being a roadway vehicle;

transmitting, by the processor, a signal from the virtual driver system to a control system of the autonomous vehicle such that, in the coupling mode, the autonomous vehicle is being bounded within a pre-defined geofenced location based on an engagement status of the accessory to the autonomous vehicle;

receiving, by the processor, a first signal from a first sensor configured to detect a presence of a king pin within a throat of a fifth-wheel hitch of an autonomous vehicle, wherein the first sensor is cooperatively coupled to the fifth-wheel hitch of the autonomous vehicle;

assigning, by the processor, a first value to the first signal by:

increasing the first value as a strength of the first signal increases due to a reduction in a distance between the king pin and the first sensor while the autonomous vehicle is being bound within a coupling zone in the pre-defined geofenced location, the coupling zone including an area to hitch the king pin to the autonomous vehicle;

receiving, by the processor, a second signal from a second sensor configured to detect a jaw of the fifth-wheel hitch, wherein the second sensor is cooperatively coupled to the fifth-wheel hitch of the autonomous vehicle;

assigning, by the processor, a second value to the second signal by:

increasing the second value as a strength of the second signal increases due to a reduction in a distance between the jaw and the second sensor while the autonomous vehicle is being bound within the coupling zone in the pre-defined geofenced location;

determining, by the processor and in association with the coupling mode, when the first value exceeds a first threshold associated with an engagement status of the king pin and the throat;

determining, by the processor and in association with the coupling mode, when the second value exceeds a second threshold associated with an engagement status of the jaw; and responsive to at least one of the first value not exceeding the first threshold or the second value not exceeding the second threshold and the virtual driver system indicating a non-engaged status associated with the coupling mode, disabling, by the processor, the autonomous vehicle by causing the virtual driver system of the autonomous vehicle to restrict operation of the autonomous vehicle within the coupling zone of the pre-defined geofenced location until the first value exceeds the first threshold, the second value exceeds the second threshold, and the virtual driver system indicates an engaged status.

2. The method of claim 1, further comprising upon the first value exceeding the first threshold and the second value exceeding the second threshold, enabling, by the processor, the autonomous vehicle by causing the virtual driver system of the autonomous vehicle to enable operation of the autonomous vehicle to leave the pre-defined geofenced location.

3. The method of claim 1, wherein the autonomous vehicle is a tractor configured to attach to a trailer, the accessory includes the trailer, the pre-defined geofenced location includes a tractor trailer hub parking lot, and the first value and the second value are associated with at least one mode of the virtual driver system including the coupling mode.

4. The method of claim 1, wherein the first sensor is fixedly positioned at an inner surface at a back of the throat of the fifth-wheel hitch.

5. The method of claim 1, wherein the second sensor is fixedly positioned at an entrance of the throat of the fifth-wheel hitch.

6. The method of claim 1, wherein receiving the first signal comprises measuring a capacitance between the first sensor and the king pin.

7. The method of claim 1, wherein receiving the second signal comprises measuring a capacitance between the second sensor and the jaw of the fifth-wheel hitch.

8. The method of claim 1, wherein disabling the autonomous vehicle further comprises one of removing power to a prime mover of the autonomous vehicle or engaging a brake of the autonomous vehicle.

9. The method of claim 1, wherein the processor is configured for autonomously maneuvering the autonomous vehicle without human intervention and the first sensor is an inductive proximity sensor configured to detect the presence of the king pin based on an electromagnetic field associated with the king pin.

10. The method of claim 1, further comprising:

receiving, by the processor from a third sensor, an indication of a rotation of the king pin in relation to the throat of the fifth-wheel hitch, wherein the third sensor is cooperatively coupled to the fifth-wheel hitch of the autonomous vehicle.

11. A system comprising:

a first sensor;

a second sensor; and one or more processors, wherein the one or more processors are configured to:

set a drive mode of a virtual driver system to a coupling mode of attempting to couple an accessory to an autonomous vehicle, the virtual driver system being hosted on a device remote from the autonomous vehicle, the autonomous vehicle being a roadway vehicle;

transmit a signal from the virtual driver system to a control system of the autonomous vehicle such that, in the coupling mode, the autonomous vehicle is being bounded within a pre-defined geofenced location based on an engagement status of the accessory to the autonomous vehicle;

receive a first signal from the first sensor configured to detect a presence of a king pin within a throat of a fifth-wheel hitch of the autonomous vehicle, the first sensor cooperatively coupled to the fifth-wheel hitch of the autonomous vehicle;

assign a first value to the first signal by:

increasing the first value as a strength of the first signal increases due to a reduction in a distance between the king pin and the first sensor while the autonomous vehicle is being bound within a coupling zone in the pre-defined geofenced location, the coupling zone including an area to hitch the king pin to the autonomous vehicle;

receive a second signal from the second sensor configured to detect a jaw of the fifth-wheel hitch, the second sensor cooperatively coupled to the fifth-wheel hitch of the autonomous vehicle;

assign a second value to the second signal by:

increasing the second value as a strength of the second signal increases due to a reduction in a distance between the jaw and the second sensor while the autonomous vehicle is being bound within the coupling zone in the pre-defined geofenced location;

determine, in association with the coupling mode, when the first value exceeds a first threshold associated with an engagement status of the king pin and the throat;

determine, in association with the coupling mode, when the second value exceeds a second threshold associated with an engagement status of the jaw;

responsive to the second value exceeding the second threshold, cause the autonomous vehicle to lock the jaw around the king pin; and responsive to at least one of the first value not exceeding the first threshold or the second value not exceeding the second threshold and the virtual driver system indicating a non-engaged status associated with the coupling mode, disable the autonomous vehicle by causing the virtual driver system of the autonomous vehicle to restrict operation of the autonomous vehicle within the coupling zone of the pre-defined geofenced location until the first value exceeds the first threshold, the second value exceeds the second threshold, and the virtual driver system indicates an engaged status.

12. The system of claim 11, wherein the one or more processors are further configured to enable the autonomous vehicle by causing the virtual driver system of the autonomous vehicle to enable operation of the autonomous vehicle to leave the pre-defined geofenced location upon the first value exceeding the first threshold and the second value exceeding the second threshold.

13. The system of claim 11, wherein the autonomous vehicle is a tractor configured to attach to a trailer, the accessory includes the trailer, the pre-defined geofenced location includes a tractor trailer hub parking lot, and the first value and the second value are associated with at least one mode of the virtual driver system including the coupling mode.

14. The system of claim 11, wherein the first sensor is fixedly positioned at an inner surface at a back of the throat of the fifth-wheel hitch.

15. The system of claim 11, wherein the second sensor is fixedly positioned at an entrance of the throat of the fifth-wheel hitch.

16. The system of claim 11, wherein the first sensor is configured to measure a capacitance between the first sensor and the king pin.

17. The system of claim 11, wherein the second sensor is configured to measure a capacitance between the second sensor and the jaw of the fifth-wheel hitch.

18. The system of claim 11, wherein the one or more processors are configured to disable the autonomous vehicle by removing power to a prime mover of the autonomous vehicle or engaging a brake of the autonomous vehicle.

19. The system of claim 11, further comprising:

a third sensor configured to measure an angle of rotation of the king pin in relation to the throat of the fifth-wheel hitch, wherein the third sensor is cooperatively coupled to the fifth-wheel hitch of the autonomous vehicle.

20. An engagement verification system for verifying trailer engagement for an autonomous vehicle, the engagement verification system comprising:

a first sensor operatively coupled to a fifth-wheel hitch of an autonomous vehicle;

a second sensor operatively coupled to the fifth-wheel hitch; and a remote user device located remotely from the autonomous vehicle, the remote user device comprising one or more processors in communication with one or more memory devices, the one or more processors programmed to:

set a drive mode of a virtual driver system to a coupling mode of attempting to couple an accessory to an autonomous vehicle, the virtual driver system being hosted on a device remote from the autonomous vehicle, the autonomous vehicle being a roadway vehicle;

transmit a signal from the virtual driver system to a control system of the autonomous vehicle such that, in the coupling mode, the autonomous vehicle is being bounded within a pre-defined geofenced location based on an engagement status of the accessory to the autonomous vehicle;

receive a first signal from the first sensor configured to detect a presence of a king pin within a throat of the fifth-wheel hitch;

assign a first value to the first signal by:

increasing the first value as a strength of the first signal increases due to a reduction in a distance between the king pin and the first sensor while the autonomous vehicle is being bound within a coupling zone in the pre-defined geofenced location, the coupling zone including an area to hitch the king pin to the autonomous vehicle;

receive a second signal from the second sensor configured to detect a jaw of the fifth-wheel hitch;

assign a second value to the second signal by:

increasing the second value as a strength of the second signal increases due to a reduction in a distance between the jaw and the second sensor while the autonomous vehicle is being bound within the coupling zone in the pre-defined geofenced location;

determine when the first value exceeds a first threshold;

determine when the second value exceeds a second threshold;

responsive to at least one of the first value not exceeding the first threshold or the second value not exceeding the second threshold and the virtual driver system indicating a non-engaged status associated with the coupling mode, lock the autonomous vehicle in the coupling mode; and limit operation of the autonomous vehicle by causing the virtual driver system of the autonomous vehicle to restrict operation of the autonomous vehicle within the coupling zone of the pre-defined geofenced location until the first value exceeds the first threshold, the second value exceeds the second threshold, and the virtual driver system indicates an engaged status; and responsive to the first value exceeding the first threshold and the second value exceeding the second threshold, set the autonomous vehicle in a coupled mode; and enable the autonomous vehicle by causing the virtual driver system of the autonomous vehicle to enable operation of the autonomous vehicle outside the pre-defined geofenced location.

* * * * *